United States Patent
Allen-Rouman et al.

(10) Patent No.: US 8,538,870 B2
(45) Date of Patent: Sep. 17, 2013

(54) ELECTRONIC PURCHASING AND FUNDS TRANSFER SYSTEMS AND METHODS

(75) Inventors: Terry Allen-Rouman, South San Francisco, CA (US); Jack Michael Arrington, Alamo, CA (US); Keval Desai, Atherton, CA (US); Robert Edwin Dravenstott, Foster City, CA (US); Wendy D. Larson, Orinda, CA (US); Scott J. Levokove, San Francisco, CA (US); John Joseph Mascavage, III, Foster City, CA (US); Peter Eric Philipp, San Francisco, CA (US); Margaret Morgan Weichert, San Carlos, CA (US)

(73) Assignees: First Data Corporation, Greenwood Village, CO (US); The Western Union Company, Englewood, CO (US)

(*) Notice: Subject to any disclaimer, the term of this patent is extended or adjusted under 35 U.S.C. 154(b) by 156 days.

(21) Appl. No.: 12/048,109

(22) Filed: Mar. 13, 2008

(65) Prior Publication Data

US 2008/0162350 A1 Jul. 3, 2008

Related U.S. Application Data

(63) Continuation of application No. 09/516,209, filed on Feb. 29, 2000, now Pat. No. 7,366,695.

(51) Int. Cl.
*G06Q 40/00* (2012.01)
(52) U.S. Cl.
USPC .............................................. 705/39; 705/35
(58) Field of Classification Search
CPC ............................. G06Q 40/20; G06Q 20/02

USPC .................................................... 705/39, 35
See application file for complete search history.

(56) References Cited

U.S. PATENT DOCUMENTS

| 4,678,895 A | 7/1987 | Tateisi et al. |
| 5,220,501 A | 6/1993 | Lawlor et al. |

(Continued)

FOREIGN PATENT DOCUMENTS

| EP | 0949596 A2 | 10/1999 |
| EP | 1077436 A2 | 2/2001 |

(Continued)

OTHER PUBLICATIONS

Merriam-Webster's Collegiate Dictionary, Tenth Ed., 1998, p. 472.

(Continued)

*Primary Examiner* — Thomas M. Hammond, III
*Assistant Examiner* — John Scarito
(74) *Attorney, Agent, or Firm* — Kilpatrick Townsend & Stockton LLP

(57) ABSTRACT

An electronic transaction method, funds transfer apparatus and method for facilitating a funds transfer. The methods comprise sending information from a purchaser or payor to a funds transfer system separate from a vendor system or payee, validating and confirming personal financial information at the funds transfer system, and transferring funds from a purchaser or payor account to the vendor or a payee account without exposing either party's financial and account information to the other. Additionally, a funds transfer apparatus is disclosed comprising connections to a payor and payee system and mechanisms for receiving and validating party and transaction information and a mechanism for transferring funds from one party to the other.

9 Claims, 5 Drawing Sheets

(56) References Cited

U.S. PATENT DOCUMENTS

| | | | |
|---|---|---|---|
| 5,326,960 | A | 7/1994 | Tannenbaum |
| 5,350,906 | A | 9/1994 | Brody et al. |
| 5,383,113 | A | 1/1995 | Kight et al. |
| 5,453,601 | A | 9/1995 | Rosen |
| 5,557,518 | A | 9/1996 | Rosen |
| 5,649,116 | A | 7/1997 | McCoy et al. |
| 5,677,955 | A | 10/1997 | Doggett et al. |
| 5,677,966 | A | 10/1997 | Doerrer et al. |
| 5,699,528 | A | 12/1997 | Hogan |
| 5,740,364 | A | 4/1998 | Drerup |
| 5,745,886 | A | 4/1998 | Rosen |
| 5,757,917 | A | 5/1998 | Rose et al. |
| 5,758,126 | A | 5/1998 | Daniels et al. |
| 5,787,402 | A | 7/1998 | Potter et al. |
| 5,802,497 | A | 9/1998 | Manasse |
| 5,825,881 | A | 10/1998 | Colvin, Sr. |
| 5,826,241 | A | 10/1998 | Stein et al. |
| 5,873,072 | A | 2/1999 | Kight et al. |
| 5,878,215 | A | 3/1999 | Kling et al. |
| 5,883,810 | A | 3/1999 | Franklin |
| 5,890,140 | A | 3/1999 | Clark et al. |
| 5,899,980 | A | 5/1999 | Wilf et al. |
| 5,903,721 | A * | 5/1999 | Sixtus ............................ 726/2 |
| 5,909,492 | A | 6/1999 | Payne et al. |
| 5,915,023 | A | 6/1999 | Bernstein |
| 5,920,847 | A | 7/1999 | Kolling et al. |
| 5,944,825 | A * | 8/1999 | Bellemore et al. ............ 726/18 |
| 5,949,044 | A | 9/1999 | Walker et al. |
| 5,987,132 | A | 11/1999 | Rowney |
| 5,987,140 | A | 11/1999 | Rowney et al. |
| 5,987,429 | A | 11/1999 | Maritzen et al. |
| 5,991,749 | A | 11/1999 | Morrill, Jr. |
| 5,991,750 | A | 11/1999 | Watson |
| 5,999,625 | A | 12/1999 | Bellare et al. |
| 6,002,771 | A | 12/1999 | Nielsen |
| 6,012,045 | A | 1/2000 | Barzilai et al. |
| 6,012,048 | A | 1/2000 | Gustin et al. |
| 6,026,440 | A * | 2/2000 | Shrader et al. ............... 709/224 |
| 6,029,150 | A | 2/2000 | Kravitz |
| 6,032,133 | A | 2/2000 | Hilt et al. |
| 6,044,362 | A | 3/2000 | Neely |
| 6,064,990 | A | 5/2000 | Goldsmith |
| 6,070,798 | A | 6/2000 | Nethery |
| 6,078,907 | A | 6/2000 | Lamm |
| 6,088,683 | A | 7/2000 | Jalili |
| 6,098,053 | A * | 8/2000 | Slater ............................ 705/44 |
| 6,102,287 | A | 8/2000 | Matyas, Jr. |
| 6,119,106 | A | 9/2000 | Mersky et al. |
| 6,122,624 | A | 9/2000 | Tetro et al. |
| 6,122,625 | A | 9/2000 | Rosen |
| 6,128,603 | A | 10/2000 | Dent et al. |
| 6,175,823 | B1 | 1/2001 | Van Dusen |
| 6,193,155 | B1 | 2/2001 | Walker et al. |
| 6,246,996 | B1 | 6/2001 | Stein et al. |
| 6,289,322 | B1 | 9/2001 | Kitchen et al. |
| 6,298,335 | B1 | 10/2001 | Bernstein |
| 6,304,860 | B1 | 10/2001 | Martin, Jr. et al. |
| 6,347,305 | B1 | 2/2002 | Watkins |
| 6,351,739 | B1 | 2/2002 | Egendorf |
| 6,367,693 | B1 | 4/2002 | Novogrod |
| 6,393,412 | B1 | 5/2002 | Deep |
| 6,408,284 | B1 | 6/2002 | Hilt et al. |
| 6,442,529 | B1 | 8/2002 | Krishan et al. |
| 6,488,203 | B1 | 12/2002 | Stoutenburg et al. |
| 6,607,113 | B2 | 8/2003 | Cilia et al. |
| 6,609,113 | B1 * | 8/2003 | O'Leary et al. ............... 705/39 |
| 6,675,153 | B1 * | 1/2004 | Cook et al. .................... 705/74 |
| 6,761,309 | B2 | 7/2004 | Stoutenburg et al. |
| 7,089,202 | B1 | 8/2006 | McNamar et al. |
| 7,202,639 | B2 | 4/2007 | Lawahmeh |
| 7,333,953 | B1 | 2/2008 | Banaugh et al. |
| 7,337,144 | B1 | 2/2008 | Blinn et al. |
| 7,366,695 | B1 | 4/2008 | Allen-Rouman et al. |
| 2001/0039535 | A1 * | 11/2001 | Tsiounis et al. ............... 705/71 |
| 2002/0004783 | A1 | 1/2002 | Paltenghe et al. |
| 2002/0055909 | A1 | 5/2002 | Fung et al. |
| 2002/0087465 | A1 | 7/2002 | Ganesan et al. |
| 2002/0123926 | A1 | 9/2002 | Bushold et al. |
| 2002/0139849 | A1 | 10/2002 | Gangi |
| 2002/0169712 | A1 | 11/2002 | Ginzboorg et al. |
| 2003/0158818 | A1 | 8/2003 | George et al. |
| 2004/0138947 | A1 | 7/2004 | McGee et al. |
| 2004/0199431 | A1 * | 10/2004 | Ganesan et al. ............... 705/26 |

FOREIGN PATENT DOCUMENTS

| | | |
|---|---|---|
| WO | WO 9966436 A1 | 12/1999 |
| WO | WO 0022559 A1 | 4/2000 |
| WO | WO 0046725 A1 | 8/2000 |
| WO | WO 0054122 A2 | 9/2000 |
| WO | WO 0067177 | 11/2000 |
| WO | WO 0079452 | 12/2000 |
| WO | WO 0104816 | 2/2001 |
| WO | WO 0205195 A1 | 1/2002 |

OTHER PUBLICATIONS

Barron's Dictionary of Finance and Investment Terms, 1998, Barron's Financial Guides, Fifth Ed., p. 3.

U.S. Appl. No. 09/991,497, Office Action dated May 22, 2008, 25 pages.

Amerinet, Inc., "Debit-It!—The Best Idea in Payment Systems Since the Credit Card", downloaded from website http://www.debit.it.com/ on Feb. 7, 2000, 8 pages.

Arthas Corp., dotBank, The Way to Send and Receive Money on the Internet, downloaded from website dotbank.com on Feb. 7, 2000.

Author Unknown "Online Payment Services" www.auctionbytes.com/cab/pages/payment, compiled Nov. 2002, 3 pages.

Author Unknown "PayPal News", www.andrys.com/paypal.html, published prior to 2003, 3 pages.

Author Unknown "PayPal.com Case Study" http://fox.rollins.edu/~slackman/paypal.htm, 2001, 6 pages.

Boneh, Dan "Beaming Money by Email is Web's Next killer App", PR Newswire, Nov. 16, 1999, pp. 1-4.

Business Editors and High-Tech Writers "billserv.com Launches bills.com, an Internet Portal for Consumers to Pay Bills Online at No Cost" Business Wire, Feb. 22, 2000, pp. 1-2, New York.

Business Wire, "E-Commerce, Email and E-greeting Cards Combine in New Web Site Designed by Interactive Bureau", Sep. 14, 1999 (abstract), [online] [retrieved on May 1, 2002], retrieved from PROQUEST Database, 2 pages.

Confinity, Inc. "PayPal for the Palm", www.handheldnew.com/file.asp?ObjectID=5401, published prior to Oct. 2003, 2 pages.

Confinity, Inc., PayPal.com, How PayPal.com Works, download from website http://www.paypal.com on Feb. 7, 2000, 7 pages.

Corporate EFT Report, "New Treasury Innovations Brought to Virginia County," Dec. 22, 1999, vol. 19, Iss. 25, p. 1, (aka Corporate EFT Report).

Hoffman, Karen Epper "PayPal Still Running Free, But the e-payments company's carefree days may be numbered if regulators decide it's essentially a bank" Bank Technology News, published between 2001-2003, www.banktechnews.com/btn/articles/btnoct01-13.shtml, 3 pages.

Idealab Company, "PayMe.com," download from website http://ssl.idealab.com on Feb. 16, 2000, 7 pages.

Intell-A-Check Corp.: "Intell-A-Check!—The Way to get Paid", Intell-A-Check product overview, retrieved from http://www.icheck.com/ on Feb. 7, 2000, 7 pages.

Latour, Almar "PayPal Electronic Plan May be On the Money in Years to Come", The Wall Street Journal Interactive Edition, Nov. 15, 1999, downloaded from www.paypal.com/html/wsj.html, 2 pages.

Markowitz, Michael, Mahwah, N.J., "Telecommunications Firm Uses Electronic Payment System," Record, Hackensack, N.J., Jul. 9, 1999 (aka record).

Mastercard International, *Secure Payment Application (SPA)*, http://www.mastercardintl.com/newtechnology/ecommercesecurity/spa/spa_faq.html, 5 pages.

Microsoft Computer Dictionary, 1997, Microsoft Press, Third Edition, p. 372.

Plotkin, Hal "Beam Me Up Some Cash" Silicon Valley Insider, Sep. 8, 1999, www.halplotkin.com/cnbcs029.htm, 3 pages.

Steiner, Ina "PayPal Online Payment Service—Another Way to Pay for Auction Items" www.auctionbytes.com, Feb. 20, 2000, 4 pages.

TeleCheck International, Inc.: "Making Checks Our Responsibility", retrieved from http://www.telecheck.com/home/home.html on Feb. 7, 2000, 8 pages.

Telecheck, Verification Services, Internet, http://telecheck.com, Feb. 7, 2000.

Transpoint, "The Way to Pay Online", downloaded from website http://www.transpoint.com/ on Feb. 10, 2000, 12 pages.

x.com, "Do More with Your Money," download from website http://www.x.com., 5 pages, Feb. 7, 2000.

Wijnen, Rene "You've Got Money!", Bank Technology News, Jun. 2000, pp. 1-4, vol. 13, Issue 6, New York.

U.S. Appl. No. 60/186,303, filed Mar. 1, 2000.

* cited by examiner

ELECTRONIC PURCHASING AND FUNDS TRANSFER SYSTEMS AND METHODS

This application is a Continuation of U.S. patent application Ser. No. 09/516,209, filed Feb. 29, 2000, entitled "ELECTRONIC PURCHASE METHOD AND FUNDS TRANSFER SYSTEM", which is hereby incorporated by reference in its entirety for all purposes.

BACKGROUND OF THE INVENTION

1. Field of the Invention

The present invention relates to an electronic purchase method and funds transfer system. Particularly, the present invention is directed to securely making an electronic purchase, suitable for both business and consumer transactions, that limits the amount of purchaser information disclosed to the seller.

2. Description of Related Art

The development of the Internet has created vast new markets and marketplaces. A consumer with an Internet connection may search for, and likely find, a wide variety of goods and services. While e-commerce flourishes, though, consumers are becoming more and more wary of the apparent free flow of sensitive personal, financial and other information that takes place over the Internet, especially incident to electronic purchasing. This concern is exacerbated by the limited amount of payment options available for electronic purchasing.

Consumer Internet payments, currently estimated well into the billions of dollars, are dominated by credit cards. Online credit card acceptance is a lucrative business for banks and other payment enablers, who typically charge merchants a "discount rate" of between 2-5% of the value of each transaction, in addition to a variety of other fees. Discount fees paid by online merchants are a significant source of business to credit card companies, and that business will continue to grow at an ever faster rate as online commerce continues to explode.

Although widespread, credit cards have significant limitations for merchants, consumers and small businesses. Merchant discount rates on the Internet are typically far higher than in the physical world. Moreover, those discount rates continue to rise.

Another disadvantage of credit card usage is that online merchants are also exposed to high fraud costs and "charge-back fees," bearing liability because there is no credit card signature with an online sale.

The dominance of credit cards also shrinks the market for online merchants and consumers. As the online population becomes more mainstream, millions of adults and teenagers without credit cards are left out of online shopping. In addition, most small business employees do not have small business credit cards.

Credit cards are also inconvenient or illegal for some businesses. For example, legal and regulatory restrictions prevent insurance brokers, mortgage brokers and money managers from accepting many types of payments via credit cards.

Furthermore, despite the dominance of credit cards on the Internet, in the overall economy, physical paper checks are still a more preferred way for most people to pay for point-of-sale purchases; this preference is particularly pronounced among certain populations of consumers (e.g. adults over 50) and in certain merchant categories (e.g. grocery stores).

Internet auctions, a particularly fast-growing segment of the Internet commerce community, are ill-adapted for credit card purchasing. Most transactions initiated through an auction site are paid for via a personal check or money order. Each of these methods has major limitations and friction for consumers: personal checks sent through the mail are slow, do not come with a guarantee, and provide bank account information to an unknown person. By contrast, money orders, while providing a payment guarantee for sellers, are inconvenient for buyers who must buy them in the physical world and pay a fee for them.

The challenges and limitations of existing Internet payment methods have led to a variety of systems and methods with a host of different solutions. These systems, however, have focused on solving either the Internet payment challenges of merchants or the payment challenges of consumers. To date, there is no system or method for making an electronic purchase that overcomes the significant obstacles of the credit card and provides a useful alternative to both merchants and consumers.

One popular system that avoids some of the problems associated with the credit card is use of a debit card. Despite increased adoption and usage of debit card payments in the physical world, however, debit cards have not been particularly successful on the Internet for a variety of reasons. The debit cards that are being used on the Internet are "offline" debit cards. "Offline" debit cards work like credit cards, without the use of a personal identification number (PIN). Unlike debit transactions using a PIN, these transactions are processed through the credit card networks, resulting in a "delayed debit," where payment is deducted 2-3 days after the transaction occurs. The "delayed debit" feature exposes banks to credit risk, and as a result, "offline" debit cards are usually only issued to individuals who already have credit cards, leaving millions of consumers without a debit vehicle for purchasing online. In addition, merchants have to pay a discount rate that is almost as high as credit card rates. Debit cards also are problematic for consumers, because many debit cards have daily volume limits that make them impractical for transactions over a particular amount. Moreover, debit cards do not have the same level of fraud protection for consumers, since they are not covered by Consumer Credit Protection Act Regulation Z. Finally, debit cards are not generally suitable for business to business transactions.

Since "online" or PIN-based debit has become so popular in the physical world, several initiatives are underway to bring PIN-based debit to the Internet. Today it is not possible to use a basic ATM card number in order to pay on the Internet. First, the information needed to process ATM card transactions, including the necessary routing information, are contained in a magnetic strip on the card. Second, a consumer's PIN requires both consumers and merchants to have access to PIN-pad technology. Existing technology does not allow for magnetic strip and PIN dependent transactions to be conducted on line. Moreover, such a system would require transmission of a consumer's closely guarded PIN over the Internet.

Other methods for electronic purchasing which have been developed by banks or check verification companies, fall into two primary categories: 1) smart-card based solutions and 2) check printing solutions. The smart card solutions are highly secure, but cumbersome, requiring consumers to have a smart card reader and smart card to pass a digital signature along with checking account information. The check printing solutions are easy for consumers, but far less secure, and require merchants to buy special check printing equipment and proprietary checks to print out (and then deposit) physical paper facsimiles of the consumer check.

Other methods for facilitating electronic payment without the use of credit cards have relied on transferring funds from a purchaser's bank account to a merchant. The prior systems and methods, however, have been unsatisfactory for a number of reasons. Most require the purchaser to communicate his or her personal financial information (including banks and account numbers) directly to the merchant each time a purchase is made, who then requests payment from a check processor. The check processor then handles the transfer of funds by creating a physical, printed check drawn on the purchaser's account, or electronically transferring funds to the merchant. Other electronic funds transfer methods require e-mail notifications to the funds recipient for every transaction. Such methods are not suitable for consumer-to-business or business-to-business use, which may include hundreds or thousands of transactions each day. Other methods require each user to have a separate account that deals specifically with a "quasi-currency", such as credits, discounts, mileage or unique "dollars" specific to the service provider, that must be converted to regular funds for each transaction. Others still require a user to own a credit card to be eligible for the service, even if funds are transferred from a separate bank account.

There is no method or system in the prior art that allows for electronic purchasing without a credit card, without transmitting financial information to a merchant, and is suitable for all types of business and consumer transactions.

SUMMARY OF THE INVENTION

The purpose and advantages of the preferred embodiment of the present invention will be set forth in and apparent from the description that follows, as well as will be learned by practice of the invention. Additional advantages of the preferred embodiment of the invention will be realized and attained by the methods and systems particularly pointed out in the written description and claims hereof, as well as from the appended drawings.

It is an object of the present invention to provide an electronic payment method wherein the transaction is approved or denied in real time. A feature of an embodiment of the present invention is a funds transfer system that authorizes or denies an electronic purchase at the time of the purchase request. An advantage of the present invention is that both the purchaser and vendor may proceed with the transaction and maintain the privacy of the parties involved.

Yet another object of the present invention is to provide a method of purchasing from a vendor that does not necessarily require ownership of a credit card. A feature of an embodiment of the present invention is a funds transfer system that securely accesses a purchaser's bank account. Yet another feature of an embodiment of the invention is a funds transfer system that debits or credits a party's credit card account if the party so chooses. Yet another embodiment of the present invention is a funds transfer system that transfers "quasi-currency." Yet another feature of an embodiment of the present invention is the use of an automated clearing house to transfer funds electronically from a purchaser to a vendor through a funds transfer system. An advantage of the present invention is that virtually any person or entity with a bank account, credit card account or "quasi-currency" plan may utilize the present payment system.

A further object of the present invention is to allow a purchaser to transfer funds from an account to a vendor without providing sensitive account information to the vendor. A feature of an embodiment of the present invention is a separate funds transfer system that validates the purchaser. Another feature of an embodiment of the present invention is that the funds transfer system, and not the vendor, accesses the purchaser's account. Another feature of an embodiment of the present invention is that account information need only be provided once to the funds transfer system. Another feature of an embodiment of the present invention is that account information is only provided to the funds transfer system. Another feature of an embodiment of the present invention is that a purchaser may register with the funds transfer system on line, via phone, via fax, on site or via regular mail. A further advantage of the present invention is that a purchaser need not provide sensitive financial information each time a purchase is made. Another advantage of the present invention is that the purchaser need not provide financial information to multiple vendors. Another advantage of the present invention is that neither the vendor nor the purchaser has access to the other's financial information. An advantage of the present invention is that fraud can be limited.

A further object of the present invention is to provide a system for making electronic purchases suitable for all types of transactions. A feature of an embodiment of the present invention is to provide a funds transfer system with purchaser account information. Another feature of an embodiment of the present invention is to provide the funds transfer system with merchant account information. Another feature of an embodiment of the present invention is to provide a merchant with digital IOU's that may be redeemed at a later time. A feature of an embodiment of the present invention is that funds may be transferred through an automated clearing house from one account to another, regardless of the owner. Another feature of an embodiment of the present invention is that the transaction may occur in real time. Another feature of an embodiment of the present invention is that the digital IOU's can be redeemed by transferring funds from a purchaser account to a merchant account through a funds transfer system. The redeeming step may further include use of an automated clearing house. An advantage of the present invention is that no e-mail notification is required for real time transactions. Yet another advantage of the present invention is that a merchant may redeem multiple digital IOU's all at once. Yet another advantage of the present invention is its suitability for consumer-to-consumer, business-to-business or consumer-to-business transactions.

In brief, the preferred embodiment of the invention is an electronic transaction method, the transaction including a user on a network, comprising the steps of: accessing a vendor system; transmitting a purchase selection to the vendor system; and selecting a payment option comprising: connecting to a funds transfer system, the funds transfer system separate from the vendor system; sending purchase data from the vendor system to the funds transfer system; sending a validation request from the funds transfer system to the user; sending validation information from the user to the funds transfer system; checking the validation information against a database at the funds transfer system, the database including user account information; wherein if the user is validated, transferring funds from the user's account to the vendor through the funds transfer system; and wherein if the user is not validated, returning a message to the user denying the purchase.

An embodiment of the invention also includes a method for making an electronic purchase comprising: connecting to a vendor system having a vendor; selecting at least one item to be purchased from the vendor system; a step for authorizing the purchase, the step comprising: sending purchase information from the vendor system to a funds transfer system, the purchase information including a purchase price, sending a request for payment information from the funds transfer system to a user; sending payment information from the user to the funds transfer system; a step for validating payment information at the funds transfer system, wherein if the payment information is validated, a step for crediting a vendor account an amount equal to the purchase price; and a step for debiting a user's account an amount equal to the purchase price.

Another embodiment of the invention is also a funds transfer apparatus comprising: at least one connection to a vendor system; at least one connection to a purchaser system; a means for validating a purchase by a purchaser using the purchaser system from a vendor using the vendor system, wherein the purchase validation means comprises: a machine readable medium having a purchaser database including purchaser information thereon; a means for receiving purchase information from the vendor system; a means for receiving payment information from the purchaser system; and a means for comparing the payment information to the purchaser information; and a means for paying the vendor for the purchase. The means for paying the vendor may comprise a connection to an automated clearing house, the automated clearing house capable of executing a funds transfer.

An embodiment of the invention also includes a method for facilitating an electronic purchase comprising: receiving purchase information from a vendor, the purchase information including a purchase price; receiving purchaser information from a purchaser, the purchaser information including an identification of a purchaser account; validating the purchaser information; wherein if the purchaser information is not validated, sending a message to the purchaser that the electronic purchase is denied; and wherein if the purchaser information is validated, sending a digital IOU to the vendor; and a step for redeeming the digital IOU. The step for redeeming the digital IOU may further comprise the steps of: receiving the digital IOU from the vendor; confirming the digital IOU; transferring the funds to the vendor; and receiving funds from the purchaser account equal to the digital IOU.

Another embodiment includes a method for transferring funds from a payor to a payee comprising: transmitting payment information to a funds transfer system, the payment information including payee identification, payor identification and payment amount; a step for validating the payment information at the funds transfer system; wherein if the payment information is not validated, notifying the payor that the payment information is not valid; and wherein if the payment information is validated, a step for transferring funds from a payor account to a payee account. The method may further comprise notifying the payee of the funds transfer. The step for validating the payment information may comprise checking the payor identification and the payee identification against a user database in the funds transfer system. That database may include account information for the payor and the payee.

It is to be understood that both the foregoing general description and the following detailed description are exemplary and are intended to provide further explanation of the invention claimed.

The accompanying drawings, which are incorporated in and constitutes part of this specification, are included to illustrate and provide a further understanding of the method and system of the invention. Together with the description, the drawings serve to explain the principles of the invention.

DETAILED DESCRIPTION OF THE PREFERRED EMBODIMENT

Reference will now be made in detail to the present preferred embodiments of the invention, examples of which are illustrated in the accompanying drawings. The methods and corresponding steps of the invention will be described in conjunction with the detailed description of the system.

The methods and systems presented herein may be used for transferring funds from a payor to a payee without either party having access to the other's financial information. The present invention is particularly suited for electronic funds transfers, such as consumer-to-business e-commerce transactions. However, the present system applies equally well to business-to-business or consumer-to-consumer transactions and is intended to cover such transactions within its scope. For purpose of explanation and illustration, and not limitation, an exemplary embodiment of the system in accordance with the invention is shown in FIG. 1.

Figure 1:
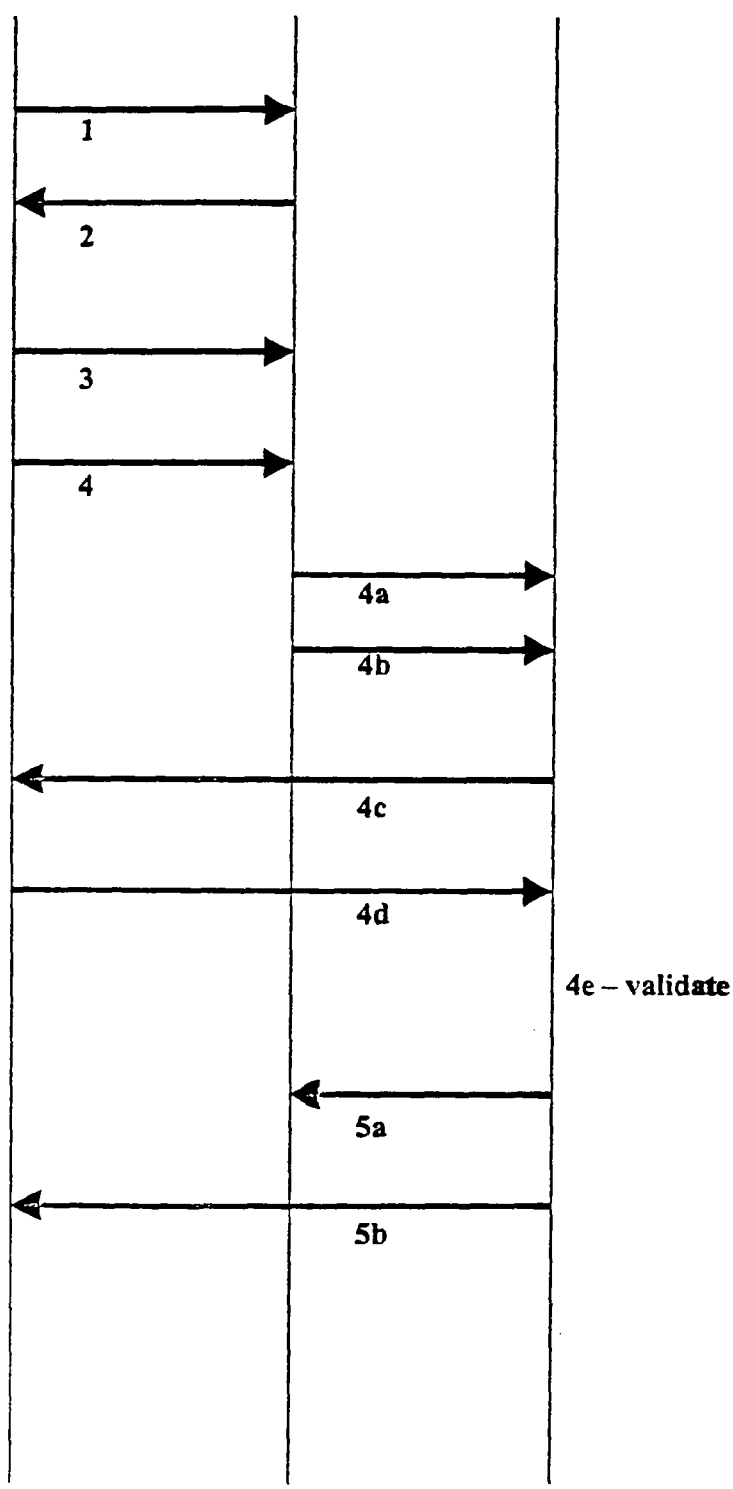
FIG. 1 is a schematic representation of an embodiment of a consumer-to-business transaction in accordance with the present invention.

FIG. 1 depicts the steps of one embodiment of the present invention. The method involves a user 10, vendor system 20, and funds transfer system 30 interconnected over a network. Typically, and in the preferred embodiment, the user 10 will access the network using a personal computer having a network connection. Such network connections may include, without limitation, any combination of modems, cable modems, wireless connections, digital subscriber lines, telephone lines, television cable lines having Internet connectivity, or other suitable network connections. In addition, the user 10 may access the network using any kind of apparatus suitable for transmitting and receiving information over a network, such as, without limitation, personal computers, handheld devices (such as wireless or modem adaptable personal data apparatuses), telephones, pagers, mobile phones or other apparatuses that may be connected, either via modem or wireless, to a network, including consoles such as may be found at a check-out area on site at a merchant store.

In the preferred embodiment, although not necessarily, the network is the Internet. However, it should be apparent from the present description of the invention that any interconnection of interfaces capable of sending and receiving information will be considered a network for purposes of the present invention. Other networks may include, without limitation, telephone networks, wireless digital networks, serial cable networks, ATM or credit card networks, or other private networks and collections of networks including intranets, local area networks, wide area networks and the Internet.

Similarly, the vendor system 20 and funds transfer system 30 maybe any system or apparatus capable of receiving or transmitting information in accordance with the present invention.

In a first embodiment of the invention, a user 10 accesses 1 a vendor system 20 over a network. There are numerous ways in which a user 10 may access 1 the vendor system 20. One way to access 1 the vendor system 20 is through an Internet browser on the user's 10 computer. For example, once the user 10 has established a connection to the network, the user 10 may enter the Universal Resource Locator (URL) of the vendor system 20 into a browser, which will then connect to the vendor system 20 and display 2 the content of the vendor system 20 on the user's terminal. In the preferred embodiment, the vendor system 20 will transmit information about goods or services offered by the vendor which the user 10 may view for purchase decision making. In another embodiment of the present invention, the electronic transaction may occur at a check-out line on site at a merchant store. In that embodiment, the steps of the present method would occur at that check-out line. For example, the step for accessing 1 the vendor system 20 may be initiated by a cashier at a cash register terminal, as is known in the art. Alternatively, check-out areas with terminals may be dispersed throughout a merchant store to allow the user 10 to purchase an item without the use of a check out line or cashier.

If the user 10 so desires, the user 10 may choose to purchase goods or services from the vendor. Once the user 10 makes a purchase selection, such selection is transmitted 3 to the vendor system 20. Such transmission may take a variety of forms and will be determined in large part by the particular look and feel of the vendor system 20. For example, the user 10 may simply click on an item in the browser. Alternatively, the user 10 may drag and drop icons to indicate a desire to make a purchase. The user 10 may also be required to enter particular data, such as by typing, to identify the goods or services to be bought. In other embodiments, such as the on-site transaction, the step for transmitting a purchase selection 2 may include, without limitation, scanning a particular item or entering an item code, such as a SKU number or bar code, into the vendor system 20.

Once a purchase selection has been transmitted 3 to the vendor system 20, the user will typically select 4 one of a variety of available payment options. The selection 4 may be accomplished in a number of ways, including without limitation, selecting from drop down, pop-up or side slide menus, entering text or data, clicking on a link or icon. The step for selection 4 may also be accomplished automatically by the vendor system 20 in accordance with a known user 10 preference which may have been communicated to the vendor system 20 at a previous time, and such selection is intended to be within the scope of the present invention. Alternative embodiments include communicating to an on-site merchant of the desire to use the present method, as may be done, for example, orally or by entering a code, such as user name or password, on a console at the check-out line.

In accordance with the preferred embodiment, the payment option comprises several steps that permit transfer of personal information of the user 10, such as sensitive financial information including bank identifications, names and addresses, social security numbers, dates of birth, phone numbers, drivers license numbers, account numbers, routing numbers, account balances and other financial data, to a funds transfer system 30 without exposure to the vendor system 20. Accordingly, the payment option comprises connecting 4a to a funds transfer system 30 separate from the vendor system 20. The step for connecting 4a may be accomplished immediately once the specific payment option is selected. Alternatively, a user 10 may be required to click through to a separate Internet page hosted by the funds transfer system 30. The payment option of the present method further comprises sending 4b purchase data to the funds transfer system 30. In one embodiment in which the transaction occurs over the Internet through a web browser, the connection 4a and sending of purchase information 4b may be accomplished in one step. For example, the vendor system 20 may generate a Hypertext Transfer Protocol (HTTP) redirect to the user's 10 browser that contains the purchase information in a query string, along with a specified URL that returns the user 10 to the vendor system 30 after authorization. In addition, the vendor system 20 may generate a digital signature to accompany the purchase data to the funds transfer system 30 via a secure SSL connection. For example, the vendor system 20 may transmit an amount, a unique merchant identifier, and the type of authorization requested. The purchase data, including the digital signature, may be stored at the funds transfer system 30 to compare it with a request for payment from the vendor system 20 submitted at a later time. All such methods are intended to be within the scope of the present invention.

The payment option further comprises sending 4c a validation request from the funds transfer system 30 directly to the user 10. In one embodiment, the validation request may take the form of a "pop-up" window. Alternatively, the request may be a form on a separate page. Preferably, although not necessarily, the validation page or window will have the same look and feel as the vendor system 20. Consequently, the present method may be more seamlessly integrated into the on line shopping process. The present method may also be adapted for on site purchasing using input consoles at a store, as are known in the art. In response to the request for validation information, the user 10 transmits 4d validation information to the funds transfer system 30.

In one embodiment of the present invention, the validation information and validation request may be presented in a graphical interface resembling a check. For example, an image of a check may be transmitted to the user's terminal having several input fields as might be found on a check, such as payee, date, amount, memo, and signature line where a user might enter a unique identifier or password. In other embodiments, the check image may have certain information already filled in, such as amount, payee, or date, as that information may be included in the purchase data provided by the vendor system 20. The present method may also include a step for accepting or canceling the transaction, such as by including "submit" or "cancel" buttons which the user 10 clicks after completing the check. If the user 10 selects the "cancel" button, the user 10 may be notified that the transaction has been aborted. Other interfaces may also be used within the scope of the present invention to submit validation information.

Validation information may be any data pertaining to the identification of the user 10 or an account of the user 10. For example, if the user 10 has already been assigned a password by the funds transfer system 30, and the funds transfer system 30 has account information for the user 10, the validation information may consist only of a password. Alternatively, the validation information may include name, address, financial institution, account numbers, social security numbers, or any other means for identifying a source of funds available to the user 10.

The payment option further comprises a step for checking 4e the validation information against a database at the funds transfer system 30. In one embodiment, the database includes validation information for users 10 who have previously used the funds transfer system 30. The database allows the funds transfer system 30 to match the user 10 with account information specific to that user 10. Accordingly, the user's 10 account information is maintained logically and physically separate from the vendor system 20 and need not be exposed to the vendor system 20.

If the validation information provided by the user 10 is recognized by the funds transfer system 30, the user is validated and the funds transfer system 30 transmits a vendor authorization to the vendor system 20. Such vendor authorization may include a digital IOU comprising all or some of the purchase data and any unique authorization information that will allow the vendor to redeem the digital IOU and receive funds therefor at a later time. Upon redemption, the funds transfer system 30 transfers funds Sa from a user's 10 account to the funds transfer system 30, which then transfers funds to the vendor system 20.

If, on the other hand, the user 10 is not validated, the funds transfer system 30 may return a message 5b to the user 10 that the transaction was denied. Alternatively or in addition, the funds transfer system 30 may send a request to the user 10 for information to create a user account on the system 30.

Figure 2:
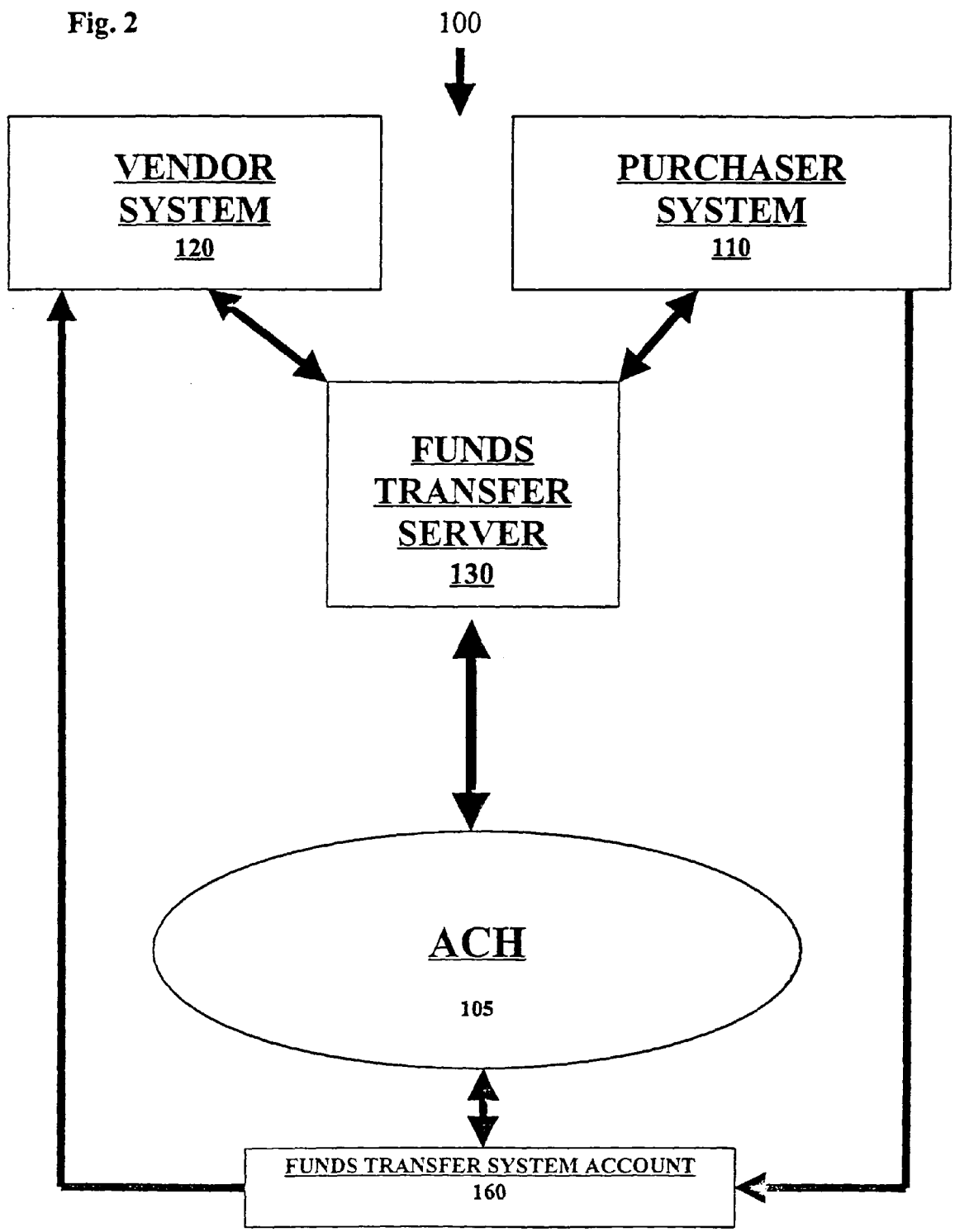
FIG. 2 is a schematic representation of an embodiment of a funds transfer system in accordance with the present invention.

A further aspect of the present invention, a funds transfer system, is shown in FIG. 2 and designated generally as numeral 100. The system 100 comprises a funds transfer server 130 having at least one connection each to a vendor system 120 and a purchaser system 110. In the preferred embodiment, each of the server 130, vendor system 120 and purchaser system 110 are computers. Preferably, although not necessarily, the server 130 and vendor system 120 are network servers having a plurality of network connections and capable of hosting Internet sites. The purchaser system 110 is typically a home computer having a modem or other connection to the Internet. In alternative embodiments, the purchaser system 110 may be a handheld computer, cellular phone, telephone, input console, or any device capable of receiving and transmitting data. Likewise, the vendor system 120 may be any apparatus capable of transmitting or receiving data.

Figure 3:
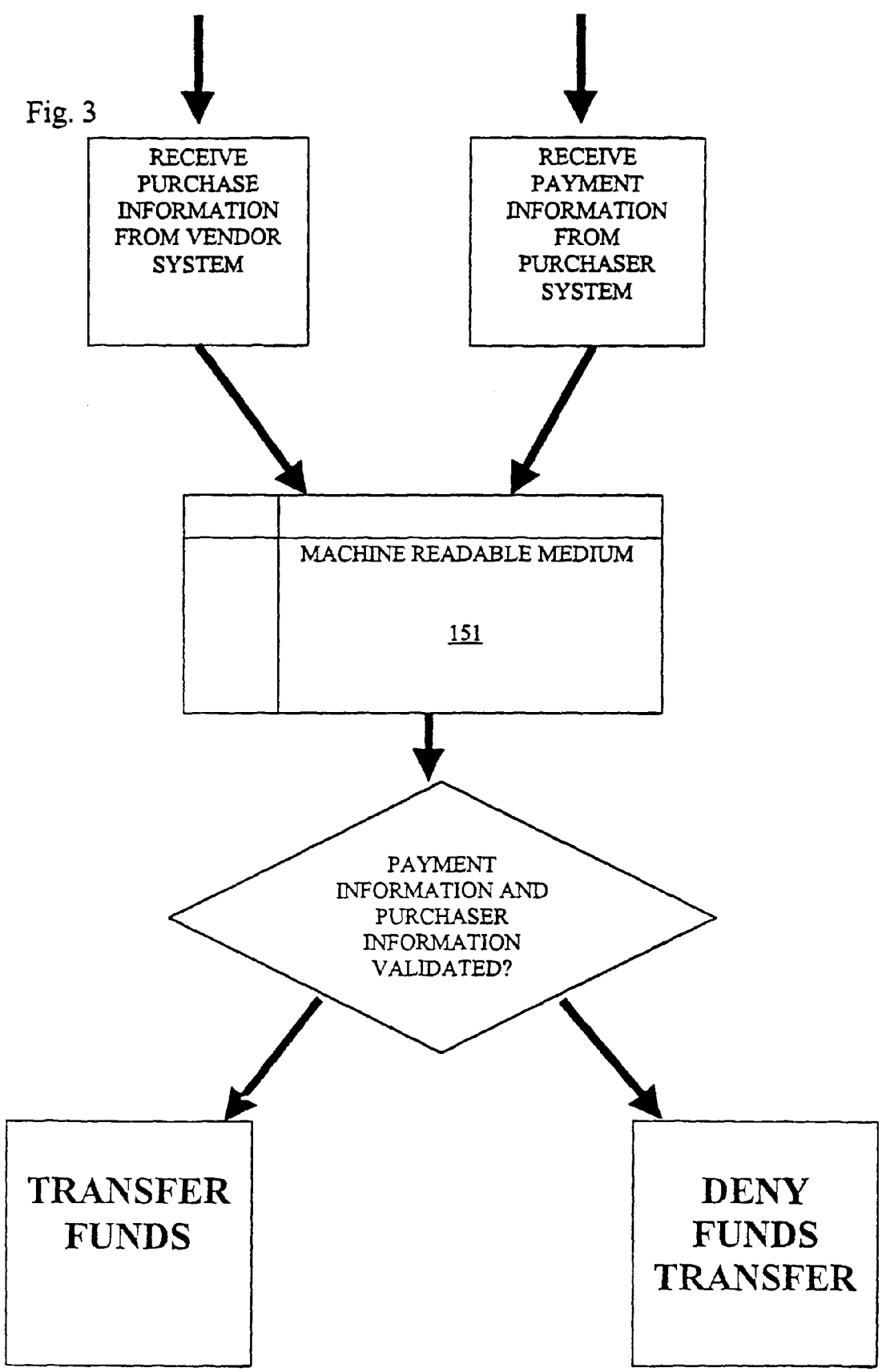
FIG. 3 is a schematic representation of a purchase validation means in accordance with an embodiment of a funds transfer system of the present invention.

The funds transfer system 100 further comprises a means for validating a purchase by a purchaser using the purchaser system 110 from a vendor using the vendor system 120, depicted in FIG. 3. In the preferred embodiment, the purchase validation means comprises, either on or in connection to the funds transfer server 130, a machine readable medium 151 having a purchaser database including purchase information thereon. The machine readable medium 151 may be a hard disk, compact disk, read only memory, magnetic tape or other medium capable of storing data. The purchase validation means further comprises receiving purchase information from the vendor system 120 and payment information from the purchaser system 110. Purchase information may include any information capable of identifying the vendor and/or the purchase, including a vendor identification, name of goods, purchase price or other digital signatures. The payment information may include financial information of the purchaser, a purchaser identification, such as a password, a name, address or other unique purchaser identification. Either receiving means may comprise a file transfer protocol, HTTPS interface or other data transfer means as will be known to those with skill in the art.

The purchase validation means further comprises validating the purchaser and payment information. In one embodiment, the purchaser information is compared to the purchaser database on the machine readable medium to determine if the purported purchaser is authorized to use the present system. The purchaser information may also be compared to third party databases connected to the funds transfer server 130 to perform a risk assessment on the purchaser. Likewise, the payment information may be validated by checking vendor information against a vendor database.

The system further comprises a means for paying the vendor for the purchase. In the preferred embodiment, the means for paying the vendor comprises a connection to an automated clearinghouse (ACH). The ACH network is a national electronic payments network used by financial institutions and corporations for settling accounts. In the preferred embodiment of the present invention, the ACH calculates a net debit or credit position for the payee and payor (vendor and purchaser) according to the information in the funds transfer system. The ACH then posts the net debit or credit position of those parties to the appropriate financial institutions, such as where the parties have accounts. For example, if a vendor has a net credit, the ACH transfers funds from a funds transfer system account to the vendor. On the other hand, a purchaser may post a net debit, and the ACH would transfer funds from the purchaser account to the funds transfer system account. In the preferred embodiment, the funds transfer system account would be an account owned or operated by the administrator of the funds transfer system. Hence, in the preferred embodiment, the funds transfer system 100 may further comprise a funds transfer account 160 through which funds from the ACH may pass to and from a vendor and purchaser account. Through use of the present system, funds may be transferred easily from a payor to payee without either party having access to the other party's financial information.

Figure 4:
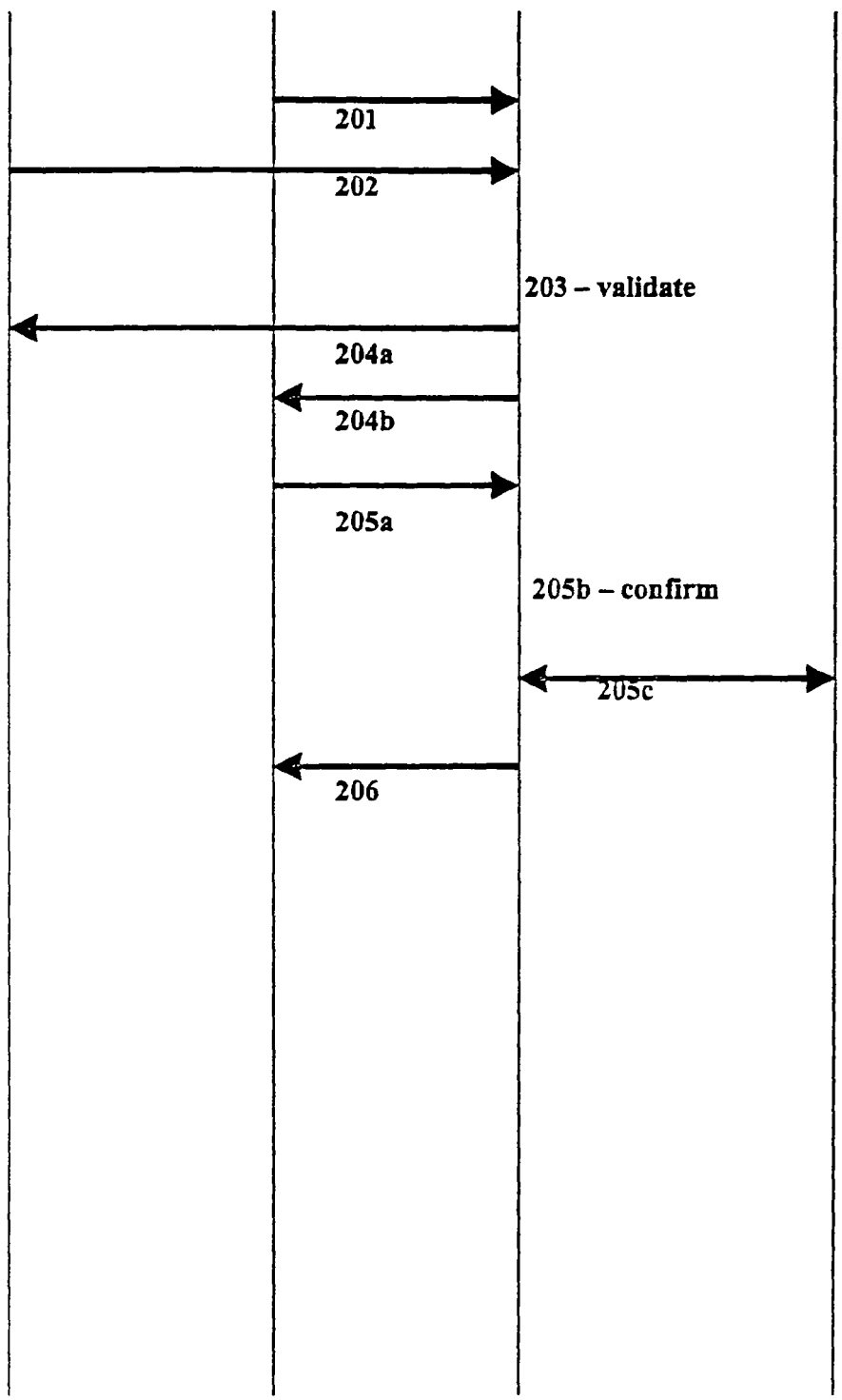
FIG. 4 is a schematic representation of an embodiment of a funds transfer method according to the present invention.

Yet another embodiment of the present invention is disclosed in FIG. 4. In FIG. 4, the funds transfer comprises sending a digital IOU to the vendor 220 so that the vendor 220 may submit a plurality of digital IOU's to the funds transfer system 230 for settlement at, for example, the end of each business day.

After selecting a payment option consistent with the present invention, the vendor 220 sends 201 purchase information to the funds transfer system 230. The purchase information should include at least a purchase price for the portion of the transaction being paid for. Purchase information may also include a description of the goods and services being purchased, vendor identification, or other data that may be helpful in organizing and implementing the present method. The funds transfer system 230 also receives 202 purchaser information from the purchaser 210. Such purchaser information should include at least an identification of a purchaser account 240. Moreover, the step for receiving purchaser information is performed directly between the funds transfer system 230 and the purchaser 210 so that purchaser information is not exposed to the vendor 220. Purchaser information may be similar to the validation information of FIG. 1, and may be obtained in a similar fashion.

After receipt of the purchaser information, the funds transfer system 230 validates 203 the purchaser information. The step for validation 203 may include comparing purchaser information to validation information contained in or accessible to the funds transfer system 230. The step for validation 204 may also include a step for determining whether the funds transfer system 230 is authorized to access the purchaser's account 240.

If the purchaser information is not validated, a message may be sent 204a to the purchaser that the electronic transaction has been denied. Alternatively, the funds transfer system 230 may send a request for additional purchaser information and additional information to set up a user account on the system 230.

If validated, the funds transfer system sends 204b a digital IOU to the vendor 220. Later, the vendor 220 redeems the digital IOU. The vendor 200 may redeem multiple digital IOU's all at the same time, whether or not they originate from the same transaction or same purchaser. In that case, the vendor 200 may create a file containing a list of digital IOU's to be redeemed, including relevant identification information pertaining thereto. The step for redeeming the digital IOU comprises receiving 205a the digital IOU from the vendor 220. Digital IOU's may be transmitted and received using any File Transfer Protocol (FTP) or HTTPS file transfer interface, and such systems are well known in the art. Alternatively, the vendor 220 or administrator of the funds transfer system 230 may create its own data transfer systems.

Once received, the funds transfer system 230 confirms 205b the digital IOU. The step for confirming 205b may comprise comparing a digital signature included on the digital IOU against a digital signature log created in the funds transfer system 230 to determine the authenticity of the digital IOU and to determined the identity of the purchaser 210 to which the digital IOU pertains. Other steps for confirming the digital IOU may comprise processing the file of multiple digital IOU's to ensure the authorization or identification information contained within the file for each digital IOU is valid.

Once confirmed, the funds transfer system 230 accesses the purchaser account 240 and receives 205c funds to cover the amount of the digital IOU or digital IOU's. Alternatively, the funds transfer system 230 may send a status report to the vendor 220 for digital IOU's already settled. In one embodiment, the funds transfer system 230 may generate a settlement file with two entries for each digital IOU—one transferring funds from the purchaser account 240 to the funds transfer system 230, and another transferring funds to the vendor 220. Because the funds transfer occurs using a "middleman" (purchaser account 240 to funds transfer system 230 and funds transfer system 230 to vendor 220), funds are transferred between the vendor 220 and purchaser 210 without either having access to the other's account information. The steps for transferring funds to and from the funds transfer system 230 typically involve the use of an ACH.

Where the vendor 220 waits to redeem digital IOU's, the vendor 220 may continue to conduct transactions with the present purchaser 210 or others while waiting to settle accounts at a later time. The present embodiment may be particularly useful for consumer-to-business and business-to-business e-commerce transactions in which a vendor 220 may have multiple transactions each day. The vendor 220 may choose the present embodiment to allow settlement of all of the day's digital IOU's at the end of the business day, or at a time when traffic to the vendor's e-commerce Internet site may be reduced, such as overnight.

Figure 5:
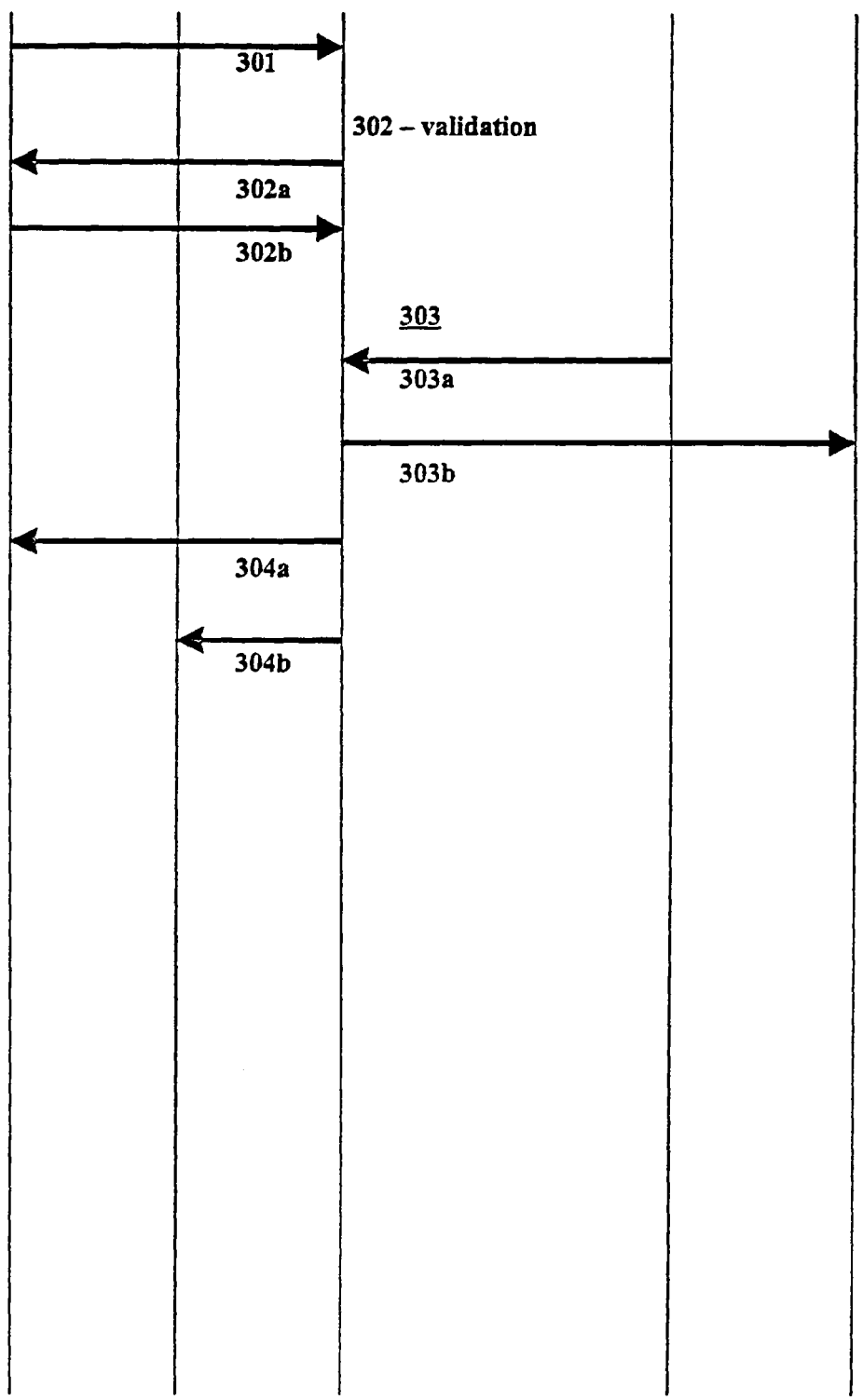
FIG. 5 is a schematic representation of an embodiment of a funds transfer method according to the present invention.

Referring now to FIG. 5, the present invention also includes a consumer-to-consumer (payor 310 to payee 320) funds transfer method. The present embodiment may be particularly useful for sending gifts, but may also be applied to funds transfers for any purpose, including settling personal debts. The method comprises transmitting 301 payment information to the funds transfer system 330. In one embodiment, a payor 310 may access the funds transfer system 330 through a web browser on payor's personal computer, although all systems capable of connecting a payor 310 to a funds transfer system 330 are intended to be within the scope of this invention. Through the web browser, the payor 310 may connect to a funds transfer system site that requests specific information. Such requests may require the payor 310 to fill out a form with specific information necessary to allow the funds transfer system 330 to perform the transaction. Such form may include an image of a check.

The payment information may include payee identification, payor identification and a payment amount. The payor identification may be any information that will allow the funds transfer system 330 to confirm the identity of the payor 310 and have access to a payor account 340. Such payor information is similar to the validation information described herein. Payee identification may comprise any useful identification of the payee, such as an e-mail address or other means for identifying and/or contacting the payee. Such identification may also include a unique funds transfer system identification.

The funds transfer system 330 next validates 302 the payment information. The validation step 302 may comprise determining whether the payment information is accurate or recognized by checking the payor and payee identifications against a database in the funds transfer system 330. The database may include account information for the payor and payee. In one embodiment, both the payor 310 and the payee 320 are validated against third party databases which the funds transfer system 330 may access over a network. Such validation step 302 may further comprise checking third party databases to see whether either the payor 310 or payee 320 has unusual traffic patterns (e.g., questionable or suspicious transaction activity), consumer complaints, questionable credit history, reports of overdrawn checks, or other information useful in assessing the risk of a particular transaction.

If the payor is not validated, a message is sent 302a to the payor 310 that the transaction is denied. The notice may also invite the payor 310 to add himself 302b to the funds transfer system 330, such as by submitting a form from an Internet site or returning an e-mail questionnaire, so that the payor 310 may conduct future transactions using the funds transfer system 330.

If the payee 320 is unrecognized, the funds transfer system may later require the payee 320 to be added to the database before transferring funds.

If both the payor 310 and payee 320 are validated, the funds transfer system 330 may send a message to the payee 320 indicating, for example, that the payee 320 has received funds. The message may be transmitted via e-mail, regular mail, telephone call, facsimile or other means of communication. The message does not contain any financial information of the payor 310.

The step for transferring funds 303 to the payee account 350 typically includes the use of the ACH. In one embodiment, a request is made from the funds transfer system 330 to the ACH to transfer funds 303a from the payor account 350 to the account of the funds transfer system 330. The payee 320 may claim the funds by accessing the funds transfer system 330, such as by visiting an Internet site, and entering payee information and information identifying the transaction. If validated, an entry is sent to the ACH to credit 303b the payee account 350 and debiting the account of the funds transfer system 330. The funds transfer system 330 may also notify 304a, 304b the payee 320 and payor 310 that the funds transfer has been completed. Such notification may include, without limitation, e-mail, network broadcast, telephone message, facsimile, or regular mail.

Alternatively, the funds transfer system 330 may contact the payee 320 to request payee information suitable to permit the funds transfer. The payee 320 may also be required to confirm identity by, for example, responding to a specific criteria provided to the funds transfer system 330 by the payor 310. Such criteria may include information known to the payor 310 and payee 320 but not otherwise generally known, such as social security number, drivers license number, telephone number, birthday, or other information capable of confirming the identity of the payee 320. This information may be checked against information provided by the payor 310 to the funds transfer system 330, or may be forwarded to the payor 310 for confirmation, such as by e-mail.

According to one embodiment, the step for transferring funds may further require the payee 320 to claim the funds through a web browser or Internet connection. For example, the payee 320 may receive an e-mail containing a link to a unique URL. The URL may contain a unique query string to identify the payee 320 and/or the transaction. The payee 320 clicks on the link and is presented with an authorization query, typically a password included in a database at the funds transfer system 330 for identifying the payee 320. Once the payee 320 is authorized, the payee 320 is brought to a "funds claim" Internet page, such as the page identified by the unique URL. The payee 320 may then choose to accept the funds by, for example, clicking on a button labeled "Accept", at which time the funds transfer system 330 may request the identity of the payee account 350 if unknown. Once the payee account 350 is identified, funds may be transferred through the ACH and the payor 310 may be notified of the completed transaction.

In any of the above embodiments, the funds transfer system 30, 100, 230, 330 may transfer funds in the form of other currency or "quasi-currency", such as gift certificates, store credits, mileage, points, foreign funds or other currencies. In addition, although the present invention is useful for transactions without credit cards, it should be apparent from the description herein that the parties may still use credit card accounts as a source of funds without departing from the scope of the invention.

It will be apparent to those skilled in the art that various modifications and variations can be made in the method and system of the present invention without departing from the spirit or scope of the invention. Thus, it is intended that the present invention include modifications and variations that are within the scope of the appended claims and their equivalents.

What is claimed is:

1. A method for facilitating an electronic purchase using a funds transfer system, the method comprising steps of:
   receiving, via a vendor system, a selection of a private payment option from a purchaser;
   once the private payment option is selected, connecting the purchaser to a funds transfer system which is separate from the vendor system so that the purchaser can transfer financial information to the funds transfer system without exposure to the vendor system;
   storing, at the funds transfer system, purchase information and a vendor system generated digital signature received from the vendor system;
   sending, by the funds transfer system, a validation request directly to the purchaser via the connection between the purchaser and the funds transfer system;
   receiving, by the funds transfer system, validation information directly from the purchaser via the connection between the purchaser and the funds transfer system in response to the validation request, wherein the validation information identifies a purchaser account;
   validating the purchaser, by the funds transfer system, by comparing the received validation information against account information maintained in a database at the funds transfer system;
   when the purchaser is validated by the funds transfer system, transmitting a digital IOU to the vendor system, wherein the digital IOU comprises the vendor system generated digital signature; and
   redeeming, via the funds transfer system, the digital IOU at a later time by:
      receiving the digital IOU from the vendor system;
      confirming the digital IOU by comparing the vendor system generated digital signature included on the received digital IOU to vendor system generated digital signatures stored in a signature log at the funds transfer system; and
      once confirmed, receiving from the purchaser account funds to cover an amount of the digital IOU at a funds transfer system account and transferring the funds from the funds transfer system account to a vendor account.

2. The method of claim 1, wherein the funds comprise: a currency, a gift certificate, a store credit, mileage, points, or foreign funds.

3. The method of claim 1, further comprising:
   notifying the vendor of the funds transfer.

4. The method of claim 1, wherein the validating step further comprises:
   checking purchaser identification and vendor identification against a user database at the funds transfer system, wherein the user database includes account information for the purchaser and the vendor.

5. The method of claim 1, wherein the purchaser account or the vendor account is a bank account or a credit card account.

6. The method of claim 1, further comprising:
   notifying the purchaser of the funds transfer.

7. The method of claim 1, wherein sending the validation request to the purchaser comprises:
   sending the validation request in the form of a pop-up window or a separate page.

8. A system for facilitating an electronic purchase using a funds transfer system, the system comprising:
   a funds transfer server configured to:
      receive, via a vendor system, a selection of a private payment option from a purchaser;
      once the private payment option is selected, connect a purchaser system to the funds transfer server which is separate from the vendor system so that the purchaser can transfer financial information to the funds transfer server without exposure to the vendor system;
      store purchase information and a vendor system generated digital signature received from the vendor system;
      send a validation request directly to the purchaser via the connection between the purchaser system and the funds transfer server;
      receive validation information directly from the purchaser via the connection between the purchaser system and the funds transfer server in response to the validation request, wherein the validation information identifies a purchaser account;
      validate the purchaser by comparing the received validation information against account information maintained in a database at the funds transfer server;
      when the purchaser is validated, transmit a digital IOU to the vendor system, wherein the digital IOU comprises the vendor system generated digital signature; and
      redeem the digital IOU at a later time by:
         receiving the digital IOU from the vendor system;
         confirming the digital IOU by comparing the vendor system generated digital signature included on the received digital IOU to vendor system generated digital signatures stored in a signature log at the funds transfer server; and
         once confirmed, receiving from the purchaser account funds to cover an amount of the digital IOU at a funds transfer server account and transferring the funds from the funds transfer server account to a vendor account.

9. A non-transitory machine readable medium having instructions stored thereon, the instructions executable by a processor for:
   receiving, via a vendor system, a selection of a private payment option from a purchaser;

once the private payment option is selected, connecting the purchaser to a funds transfer system which is separate from the vendor system so that the purchaser can transfer financial information to the funds transfer system without exposure to the vendor system;

storing, at the funds transfer system, purchase information and a vendor system generated digital signature received from the vendor system;

sending, by the funds transfer system, a validation request directly to the purchaser via the connection between the purchaser and the funds transfer system;

receiving, by the funds transfer system, validation information directly from the purchaser via the connection between the purchaser and the funds transfer system in response to the validation request, wherein the validation information identifies a purchaser account;

validating the purchaser, by the funds transfer system, by comparing the received validation information against account information maintained in a database at the funds transfer system;

when the purchaser is validated by the funds transfer system, transmitting a digital IOU to the vendor system, wherein the digital IOU comprises the vendor system generated digital signature; and redeeming, via the funds transfer system, the digital IOU at a later time by:

receiving the digital IOU from the vendor system;

confirming the digital IOU by comparing the vendor system generated digital signature included on the received digital IOU to vendor system generated digital signatures stored in a signature log at the funds transfer system; and once confirmed, receiving from the purchaser account funds to cover an amount of the digital IOU at a funds transfer system account and transferring the funds from the funds transfer system account to a vendor account.

\* \* \* \* \*